United States Patent [19]

Fujimoto et al.

[11] 3,883,490

[45] May 13, 1975

[54] RESINS CONTAINING DITHIOIC ACID GROUPS

[75] Inventors: Yasuo Fujimoto, Yokohama; Isao Masumura; Yukio Hashimoto, both of Tokyo, all of Japan

[73] Assignee: Kyowa Hakko Kogyo Co., Ltd., Japan

[22] Filed: May 15, 1973

[21] Appl. No.: 360,419

[30] Foreign Application Priority Data

May 22, 1972 Japan.............................. 47-49859

[52] U.S. Cl......... 260/79.5 NV; 210/24; 260/2.2 R; 260/79.5 R; 260/793
[51] Int. Cl. ............................................ C08f 27/06
[58] Field of Search .... 260/79.5 NV, 79.5 R, 2.2 R, 260/793

[56] References Cited
UNITED STATES PATENTS 3,347,834  10/1967  Naylor .......................... 260/79.5 R

FOREIGN PATENTS OR APPLICATIONS 1,219,626  1/1971  United Kingdom

Primary Examiner—Ronald W. Griffin
Attorney, Agent, or Firm—Craig & Antonelli

[57] ABSTRACT

Resins comprising cross-linked copolymers of aromatic vinyl compounds having dithioic acid groups and the process for the preparation thereof are disclosed.

5 Claims, No Drawings

RESINS CONTAINING DITHIOIC ACID GROUPS

This invention relates to novel resins and a process for producing the same. More particularly, the present invention relates to novel resins comprising copolymers of aromatic vinyl compounds having dithioic acid groups and being capable of strongly adsorbing metallic ions, inter alia, mercury ions, gold ions and silver ions at a pH in a wide range (preferably at a pH of about 7 or less and most preferably at a pH of about 1 to about 3), and to a process for producing said resins.

Heretofore, cation exchange resins such as sulfonic acid-type resins, carboxylic acid-type resins, etc., chelating resins such as dithizone-type resins and the like have conventionally been used for the adsorption of metallic ions. Among these conventional resins, dithizone-type chelating resins are well known to be capable of strongly adsorbing Cu ions.

However, the conventional resins are not satisfactory as regards their adsorbing ability and capacity for Hg ions. The present inventors have studied the preparation of resins capable of strongly adsorbing Hg ions and, as a result, they have found that a resin having a structure comprising a skeleton of a cross-linked copolymer of aromatic vinyl compounds to which dithioic acid groups or alkyl groups having dithioic acid groups are introduced at the aromatic nuclei has a strong ability of adsorbing Hg ions.

The term "dithioic acid group" throughout the present specification contemplates either free acid form of -CSSH or the salt form thereof.

Further, the resin has surprisingly been found to be capable of adsorbing organic mercury compounds. A resin having such dithioic acid groups as the groups participating in the adsorption has never been reported and accordingly is a novel resin.

The cross-linked copolymer of an aromatic vinyl compound, which forms a main part of the skeleton of the present resin, is well known. That is, cross-linked copolymers produced by copolymerizing conventional aromatic vinyl compounds such as styrene, vinyltoluene, vinylnaphthalene, etc. with conventional cross-linking agents such as divinylbenzene, trivinylbenzene, divinylnaphthalene, etc. The copolymer employed for the resins of the present invention preferably contains about 2 to about 60 percent by weight of the cross-linking agent based on the weight of the copolymer.

The cross-linked copolymer employed in the resin of the present invention is preferable to be in a spongy or macroporous granule-state, usually about 10 to about 150 US mesh in size but may be in a plate, film or cake form or any other form. The most preferable macroporous granules are obtained by copolymerizing an aromatic vinyl monomer and a monomeric cross-linking agent in the presence of such a solvent that can dissolve the aromatic vinylcompound but cannot dissolve or swell the resulting copolymer in a well-known manner.

The novel resins of the present invention are the above-mentioned cross-linked copolymers to which dithioic acid groups or alkyl groups having dithioic acid group are introduced at the aromatic nuclei of the polymers.

The resins of the present invention can be prepared by applying preferable conventional processes for introducing dithioic acid group or an alkyl group having dithioic acid group into aromatic compounds. Such processes may include those disclosed in German Pat. No. 1,274,121; Weyl, Houben "Methoden der Organischen Chemie", Vol. 8, page 482 and Vol. 9, pp. 747 to 748; and "Journal of the American Chemical Society," Vol. 73, pp. 24 to 31 (1951).

The most advantageous process is one disclosed in German Patent No. 1,274,121. In this German patent, it is disclosed that aromatic compounds bonded with monochloromethyl groups are reacted with sulfur and alcoholates to form aromatic compounds having dithioic acid groups. In applying this process to the preparation of the resin of the present invention, the cross-linked copolymer of an aromatic vinyl compound is first halogenoalkylated and then reacted with sulfur and alcoholates. As a modification, it is of course possible to first halogenoalkylate a monomer of an aromatic vinyl compound, then prepare a halogenoalkylate of a cross-linked copolymer of the aromatic vinyl compound by copolymerization and subsequently react the halogenoalkylated copolymer with sulfur and alcoholates.

The halogenoalkylation may preferably be carried out through Friedel-Crafts reaction, that is, by reacting a monomer or polymer of an aromatic vinyl compound with alkyl.halogenoalkylether in the presence of a catalyst such as aluminum chloride, zinc chloride and stannic chloride.

For the halogeno portion of the halogenoalkyl group, Cl is most economical, but Br, I and F are also usable. The alkyl portion of this group may be an alkyl group having up to 20 carbon atoms, but methyl, ethyl, propyl and butyl are preferably used. In this connection, it must be noted that the carbon number of dithioic acid groups or alkyl groups containing dithioic acid groups which are introduced in the aromatic nucleus corresponds to that of halogenoalkyl groups used. For example, when a halogenomethyl group is used as the halogenoalkyl group, a dithioic acid group is directly bonded to the aromatic nucleus. Further, when a halogenoethyl group is used, a methyl group containing a dithioic acid group is bonded to the aromatic nucleus. Therefore, it is understood that by changing the halogenoalkyl groups used, various types of alkyl groups containing dithioic acid group can be introduced.

The cross-linked copolymer of an aromatic vinyl compound having a halogenoalkyl group is reacted with sulfur and an alcoholate according to the following procedures.

The cross-linked copolymer is dipped in a proper amount (usually 1 – 100 times the volume of the copolymer) of a conventional solvent such as benzene, and swollen. Usually, the copolymer is swollen so as to have a volume which is about 1.2 to about 3 times its original volume. The degree of the swelling of the copolymer varies depending upon the amount of the cross-linking agent contained in the copolymer. For example, when the contents of the cross-linking agent are 10 percent, 4 percent and 2 percent, the copolymers are swollen respectively 1.8, 1.5 and 1.4 times in volume. The shape and size of the swollen copolymer exhibit almost no change when a dithioic acid group is bonded thereto.

After adding sulfur and an alcoholate thereto, the resulting mixture is heated to a proper temperature (usually 50° to 200°C) under an atmospheric or any other appropriate applied pressure for a proper period of time (usually 2 to 100 hours) to effect reaction. Generally, from about 0.01 to 2.5 moles of sulfur and from about 0.1 to 20 moles of the alcoholate are reacted with one mole of halogenoalkyl group in copolymer. Also, substantially equimolar amounts of sulfur and the alcoholate are preferably employed. $S_8$ (molecular weight: 256) is employed as sulfur. Alternatively, sulfur and an alcoholate may be reacted previously for about 1 to 5 hours, usually about 2 to 3 hours at about 50° to 200°C. The solid reaction product is separated by filtration and is added to the swollen copolymer in a solvent to effect a reaction for about 3 to about 40 hours, usually, for about 5 to about 25 hours under atmospheric pressure.

As the solvent to swell the cross-linked copolymer having a halogenoalkyl group, solvents which are chemically stable against other reagents, i.e. sulfur and alcoholates, are employed in the present process. The following are, for example, suitable for the solvent: aromatic hydrocarbons such as benzene, toluene, xylene, etc.; cyclic ethers such as tetrahydrofuran, dioxane, etc.; esters such as methyl acetate, ethyl acetate, n- or i-propyl acetate, n-, i-, sec- or tert-butyl acetate, methyl formate, ethyl formate, n- or i-propyl formate, n-, i-, sec- or tert-butyl formate, ethyleneglycol diacetate, propyleneglycol diacetate, etc.; ketones such as acetone, methylethylketone, methyl-n-propylketone, methyl-n-butyl-ketone, methyl-isobutyleketone, etc.; amides such as N, N-dimethylformamide, N, N-dimethylacetamide, etc.; dimethylsulfoxide, etc. Of course, it is possible to add other solvents to the foregoing solvents. For example, alcohols and good solvents for metal alcoholate (for example, methanol, ethanol, n-propyl alcohol, i-propyl alcohol, n-butanol, sec-butanol, tert-butanol, etc.) can be used.

As the alcoholate employed, the following are suitable: methylate, ethylate, propylate, butylate, etc. of lithium, potassium, sodium, magnesiun, calcium, aluminum, etc. Generally, the alcoholates contain from 1 to 20 carbon atoms and are derived from monohydroxy alcohols.

After the completion of the reaction, the resulting resin is washed with methanol, NaOH, etc. The washed resin is dipped and heated in a suitable solvent such as benzene, ethanol, etc. with refluxing to remove the sulfur and by-products containing sulfur remaining in the resin. For this treatment, Soxhlet extract method is also applicable. The extracting treatment is continued until the sulfur content of the resin reaches a constant value.

Elemental analysis of the thus prepared resins of the present invention reveals that the sulfur content of those resins is 3 to 30 percent by weight and no oxygen is contained therein.

In the infra-red absorption spectrum of the resin of the present invention, there is observed a peak at 1230 $cm^{-1}$ which establishes the presence of —CS— group. Therefore, it is evident that the resin has a dithioic acid group.

The resins of the present invention are prepared in the form of metal salts. The metal corresponds to that of the employed alcoholates. The metal salt form resins can easily be converted into other metal salt or ammonium salt form resins with a sulfide and a sulfohydrate. The metal salt form resins can also be converted into free acid form resins with an acid such as hydrochloric acid and the like.

The resins of the present invention are used for the adsorption of metallic ions in the conventional manner. Usually, the resin charged in a column and a solution containing metallic ions is passed therethrough at a space velocity of about 0.1 – 30 $hour^{-1}$ (the term "space velocity" contemplates liquid volume per resin volume per hour). Otherwise, the resin is added to a solution containing metallic ions and the mixture is stirred. The space velocity and the amount of the resin added to the solution are properly changed according to the concentration of the metallic ions and the like.

Inorganic metals are known to be adsorbed with the resin in the form of ions, though it is unknown how organic metals such as methyl mercuric chloride, phenyl mercuric acetate, phenyl mercuric chloride, etc. are combined with the resin.

The elution of the adsorbed metals and the regeneration of the resin can be readily effected with a 0.1 – 10 N solution of a sulfide such as sodium sulfide, ammonium sulfide, lithium sulfide, potassium sulfide, etc. or a sulfohydrate such as ammonium sulfohydrate, lithium sulfohydrate, sodium sulfohydrate, potassium sulfohydrate, calcium sulfohydrate, magnesium sulfohydrate, etc.

Now, typical examples of the present process wherein are used the polymers having the most typical halogenoalkyl group, i.e., chloromethyl, will be given below, but the present invention is not restricted thereto. It will be understood that the term "chloromethylated" refers to a vinyl compound having a chloro-substituted methyl group attached thereto. The cation exchange resins can be produced according to the exemplified processes, using the polymers having other halogenoalkyl groups than the above-mentioned one. Furthermore, other alcoholates can be used in place of the alcoholates of the following examples.

EXAMPLE 1

10 g of styrene copolymer of 20 – 80 US mesh cross-linked with 4 percent divinylbenzene is reacted with 40 ml of methyl-chloromethylether and 3 g of stannic chloride for 6 hours at 58°C with stirring. The resulting reaction mixture is washed with 500 ml of 2N-HCl. Thereafter, the decantation of the mixture is repeated several times with 500 ml each of acetone.

Granules of 20 – 80 US mesh of chloromethylated styrene copolymer are then obtained.

5.0 g of the copolymer thus obtained (containing $3.1 \times 10^{-2}$ moles of chloromethyl groups) is admixed with 28 ml of benzene in a tube having a capacity of 100 ml to swell the resin. Further, 4.0 g ($1.56 \times 10^{-2}$ moles) of sulfur powders and 6.8 g ($1.26 \times 10^{-1}$ moles) of sodium methylate are added thereto. After sealing the tube, the reaction is carried out for 28 hours at 100°C. The inside of the sealed tube is kept in a pressurized state due to the vapor pressure of the solvent and gases which seem to be formed by the side reactions. The resin thus formed is washed with methanol and 0.05 N aqueous solution of NaOH, and then dipped and heated in benzene with refluxing to remove the sulfur and sulfur compounds remaining in the resin. The refluxing is continued until the sulfur content of the resin reaches a constant value. The sulfur content in the resulting product is 10 percent by weight.

EXAMPLE 2

5.4 g of granules of 20 – 80 US mesh of the chloromethylated resin cross-linked with 4 percent divinylbenzene (containing $4.37 \times 10^{-2}$ moles of chloromethyl groups) described in Example 1 is admixed with 31 ml of N, N-dimethylformamide in a tube having a capacity of 100 ml to swell the resin. Then, 4.1 g (1.6 × $10^{-2}$ moles) of sulfur powders and 9.0 g (1.28 × $10^{-1}$ moles) of potassium methylate are added thereto. After sealing the tube, the reaction is carried out for 20 hours at 120°C. The reaction mixture is treated in the same manner as in Example 1, and the sulfur content of the product is determined to be 15 percent by weight.

EXAMPLE 3

25 g of granules of 20 – 100 US mesh of a chloromethylated polystyrene cross-linked with 2% divinylbenzene (containing 1.67 × $10^{-1}$ moles of chlorometyl groups) is admixed with 300 ml of N, N-dimethylformamide in a 500 ml four-necked flask to swell the resin. Then, 21 g (8.22 × $10^{-2}$ moles) of sulfur powders and 36.5 g (6.58 × $10^{-1}$ moles) of sodium methylate are added thereto, and subjected to reaction at an atmospheric pressure for 20 hours at 120°C with stirring. The reaction mixture is treated in the same manner as in Example 1, and the sulfur content of the product is determined to be 8 percent by weight.

EXAMPLE 4

4.5 g of granules of 20 – 100 US mesh of the chloromethylated resin cross-linked with 2 percent divinylbenzene (containing 3.0 × $10^{-2}$ moles of chloromethyl groups) described in Example 3 is admixed with 45 ml of N, N-dimethylformamide in a tube having a capacity of 100 ml to swell the resin. Then, 4.1 g (1.6 × $10^{-2}$ moles) of sulfur powders and 6.7 g (1.24 × $10^{-1}$ moles) of sodium methylate are added thereto. After sealing the tube, the reaction is carried out for 48 hours at 100°C. The reaction mixture is treated in the same manner as in Example 1, and the sulfur content of the product is determined to be 10.5 percent by weight. Adsorption capacity of the dithioic acid resin (Na form) thus prepared is examined with mercury ions. The results are given in Table 1. The test is carried out by treating 50 ml of a solution of mercuric chloride containing 1 ppm of mercury ions with 0.2 g of the dithioic acid resin in a conical flask at room temperature for 2 hours with stirring.

Table 1

| pH of the solution* | $Hg^{++}$concentration of the treated solution (ppm) |
|---|---|
| 0.1 (1N-HCl) | 0.018 |
| 1 | 0.016 |
| 2 | 0.006 |
| 3 | 0.006 |
| 4 | 0.05 |
| 6.5 | 0.3 |
| 7.6 | 0.5 |
| 9.0 | 0.6 |
| 10.7 | 0.7 |

*The pH of the solution is adjusted with HCl or NaOH.

EXAMPLE 5

4.7 g of granules of 20 – 50 US mesh of a macroporous, chloromethylated polystyrene cross-linked with 10% divinylbenzene (containing 2.86 × $10^{-2}$ moles of chloromethyl groups) is admixed with 48 ml of N, N-dimethylformamide in a tube having a capacity of 100 ml to swell the resin, and then 3.9 g (1.53 × $10^{-2}$ moles) of sulfur powders and 8.5 g (1.21 × $10^{-1}$ moles) of potassium methylate are added thereto. After sealing the tube, the reaction is carried out for 20 hours at 100°C. The reaction mixture is treated in the same manner as in Example 1, and the sulfur content in the resulting product is determined to be 17 percent by weight.

EXAMPLE 6

5.0 g of granules of 20 – 50 US mesh of a chloromethylated polystyrene cross-linked with 8 percent divinylbenzene (containing 2.9 × $10^{-2}$ moles of chloromethyl groups) is admixed with 45 ml of ethyl acetate in a tube having a capacity of 100 ml to swell the resin, and then 4.0 g (1.56 × $10^{-2}$ moles) of sulfur powders and 6.6 g (1.22 × $10^{-1}$ moles) of sodium methylate are added thereto. After sealing the tube, the reaction is carried out for 80 hours at 100°C. The reaction mixture is treated in the same manner as in Example 1, and the sulfur content in the resulting product is determined to be 7.1 percent by weight.

EXAMPLE 7

4.5 g of granules of 20 – 100 US mesh of a chloromethylated polystyrene cross-linked with 2 percent divinylbenzene (containing 3.0 × $10^{-2}$ moles of chloromethyl groups) is admixed with 20 ml of benzene in a tube having a capacity of 100 ml to swell the resin. Then, 3.7 g (1.5 × $10^{-2}$ moles) of sulfur powders and 25 g of methanol solution of sodium methylate [corresponding to 6.2 g (1.2 × $10^{-1}$ moles) of sodium methylate] are added thereto. After sealing the tube, the reaction is carried out for 70 hours at 70°C. The reaction mixture is treated in the same manner as in Example 1, and the sulfur content in the resulting product is determined to be 18 percent by weight.

EXAMPLE 8

15 g of granules of 20 – 50 US mesh of a chloromethylated polystyrene cross-linked with 10 percent divinylbenzene (containing 0.098 moles of chloromethyl groups) is admixed with 90 ml of dioxane in a 300 ml flask and the mixture is heated at 70°C. A reaction product separately obtained by reacting 6.3 g (2.46 × $10^{-2}$ moles) of sulfur powders and 38 g (0.197 moles as sodium methylate) of 28 percent solution of sodium methylate for 3 hours at 70°C, is added thereto. Further, the reaction is carried out for 20 hours at 70°C. After washed with a large amount of methanol, the reaction mixture is dissolved in ethanol and extracted therefrom by Soxhlet extract method. The sulfur content in the product obtained by the extraction carried out for 24 hours is determined to be 20 percent by weight.

EXAMPLE 9

The same procedures as in Example 2 are repeated except that 5.8 g of granules of 20 – 80 US mesh of a chloromethylated polystyrene cross-linked with 4% trivinylbenzene (containing 4.37 × $10^{-2}$ moles of chloromethyl groups) is used in place of 5.4 g of the chloromethylated resin of Example 1. The sulfur content in the resulting product is determined to be 12 percent by weight.

EXAMPLE 10

The same procedures as in Example 2 are repeated except that 6.3 g of granules of 20 – 80 US mesh of a chloroethylated polystyrene cross-linked with 4% divinylbenzene (containing 4.37 × 10⁻² moles of chloroethyl groups) is used in place of 5.4 g of the chloromethylated resin. The sulfur content in the resulting product is determined to be 11 percent by weight.

EXAMPLE 11

The same procedures as in Example 2 are repeated except that 7.2 g of granules of 20 – 80 US mesh of a chloroisopropylated polystyrene resin cross-linked with 4% divinylbenzene (containing 4.37 × 10⁻² moles of chloroispopyl groups) is used in place of 5.4 g of the chloromethylated resin. The sulfur content in the resulting product is determined to be 10 percent by weight.

EXAMPLE 12

The same procedures as in Example 5 are repeated except that 11.5 g of granules of 20 – 50 US mesh of a chloromethylated polyvinylnaphthalene resin cross-linked with 10% divinylbenzene (containing 2.86 × 10⁻² moles of chloromethyl groups) is used in place of 4.7 g of the macroporous, chloromethylated polystyrene resin. The sulfur content in the resulting product is determined to be 5 percent by weight.

EXAMPLE 13

The same procedures as in Example 5 are repeated except that 8.5 g of granules of 20 – 50 US mesh of a chloromethylated polyvinyl-m-toluene resin cross-linked with 10% divinylbenzene (containing 2.86 × 10⁻² moles of chloromethyl groups) is used in place of 4.7 g of the macroporous, chloromethylated polystyrene resin. The sulfur content in the resulting product is determined to be 6% by weight.

EXAMPLE 14

15 m$l$ of the dithioic acid resin (Na form) of Example 8 is charged in a column (10 mm in diameter) and a solution containing metallic ions, that is, 20 ppm of $Ca^{++}$, 33 ppm of $Zn^{++}$, 56 ppm of $Cd^{++}$, 32 ppm of $Cu^{++}$, 104 ppm of $Pb^{++}$, 28 ppm of $Fe^{+++}$, 100 ppm of $Hg^{++}$ and 99 ppm of $Au^{+++}$, and having a pH of 2.8 is passed through the column at a space velocity of 5 (space velocity is hereinafter referred to as S.V.).

Each 15 m$l$ of the effluent is collected as one fraction, and the metallic ion concentration of the fraction is measured according to the atomic absorption method. It is found $Hg^{++}$ concentration is kept below one ppm till the 350th fraction, and $Au^{+++}$ concentration is kept below 0.5 ppm till the 450th fraction.

The following are the experimental results for the selectivity of the resin for the adsorption of the above-mentioned metallic ions:

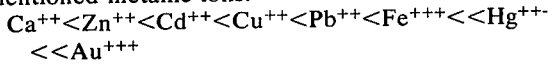

EXAMPLE 15

30 m$l$ of the dithioic acid resin (Na form) of Example 8 is charged in a column (12 mm in diameter) and an aqueous solution of mercuric chloride containing 15 ppm of mercury ions and having a pH of 2 (adjusted with HCl) is passed through the column as S.V. 15. The concentration of mercury ions is kept below 5 ppb in the effluent even after the solution is passed therethrough in a volume 2100 times as much as that of the resin.

EXAMPLE 16

30 m$l$ of the dithioic acid resin (Na form) of Example 8 is charged in a column (12 mm in diameter), and an aqueous solution of phenyl mercuric acetate containing 15 ppm of mercury ions and having a pH of 3 (adjusted with acetic acid) is passed through the column at S.V. 15. The concentration of the mercury ions is kept below 2 ppb in the effluent, even after the solution is passed therethrough in a volume 2,500 times as much as that of the resin.

EXAMPLE 17

30 m$l$ of the dithioic acid resin (Na form) of Example 8 is charged in a column (12 mm in diameter), and an aqueous solution of methyl mercuric chloride containing 15 ppm of mercury ions and having a pH of 2 (adjusted with HCl) is passed through the column at S.V. 15. The concentration of the mercury ions is kept below 2 ppb in the effluent, even after the solution is passed therethrough in a volume 3,000 times as much as that of the resin.

EXAMPLE 18

15 m$l$ of the dithioic acid resin (Na form) of Example 8 is charged in a column (10 mm in diameter), and an aqueous solution of mercuric chloride containing 2000 ppm of mercury ions and having a pH of 4.5 is passed through the column at S.V. 5 until the mercury concentration of the effluent reaches approximately the concentration of the feed solution. Then, 100 m$l$ of an 0.5 N aqueous solution of sodium sulfide is passed through the column charged with the resin that have been saturated with mercury to regenerate the resin, and the resin is washed with 100 m$l$ of water. The aqueous solution containing 2000 ppm of the mercury ions is again passed through the regenerated resin. Even after the passage of the aqueous mercury solution and regeneration by the aqueous sodium sulfide solution are repeated 4 times, the adsorbing ability of the resin is practically not lowered at all.

EXAMPLE 19

0.3 g of the dithioic acid resin (Na form) of Example 8 and 100 m$l$ of a silver nitrate solution containing 100 ppm of silver ions (pH : 1) are stirred in a conical flask at room temperature for 24 hours. The silver concentration determined by the turbidimetric method (Handbook of Analytical Chemistry; Maruzen Co.) is less than 4 ppm.

While the novel principles of the invention have been described, it will be understood that various omissions, modifications and changes in these principles may be made by one skilled in the art without departing from the spirit and scope of the invention.

What is claimed is:

1. A resin comprising a cross-linked copolymer of aromatic vinyl compounds having at least one sulfur-containing group selected from the group consisting of a dithioic acid group and an alkyl group having a dithioic acid group bonded to at least some aromatic nucleui of said copolymer.

2. The resin of claim 1, which is in free acid form.

3. The resin of claim 1, which is in metal salt form.

4. The resin of claim 1, which has a dithioic acid group in the form of a salt of a material selected from the group consisting of ammonium, lithium, potassium, sodium, magnesium, calcium and aluminium.

5. The resin of claim 1, wherein said resin has a sulfur content of from about 3 to 30 percent by weight.

* * * * *